United States Patent
Ito et al.

(10) Patent No.: US 12,525,256 B2
(45) Date of Patent: Jan. 13, 2026

(54) DISK DRIVING DEVICE FOR PREVENTING PIVOT POST FROM DROPPING FROM BASE PLATE

(71) Applicant: NIDEC CORPORATION, Kyoto (JP)

(72) Inventors: Michihiro Ito, Kyoto (JP); Kenta Miyoshi, Kyoto (JP); Takashi Mitsunari, Kyoto (JP); Masayuki Maeda, Kyoto (JP); Naoyuki Kimura, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 13 days.

(21) Appl. No.: 18/533,107

(22) Filed: Dec. 7, 2023

(65) Prior Publication Data
US 2024/0203450 A1    Jun. 20, 2024

(30) Foreign Application Priority Data
Dec. 14, 2022    (JP) .................................. 2022-199130

(51) Int. Cl.
  *G11B 5/48*    (2006.01)
  *G11B 33/02*   (2006.01)
  *G11B 33/04*   (2006.01)

(52) U.S. Cl.
  CPC .......... *G11B 5/4826* (2013.01); *G11B 33/027* (2013.01); *G11B 33/0422* (2013.01)

(58) Field of Classification Search
  None
  See application file for complete search history.

(56) References Cited

U.S. PATENT DOCUMENTS

| | | | | |
|---|---|---|---|---|
| 4,945,435 A * | 7/1990 | Boigenzahn | ....... | G11B 19/2009 |
| 5,099,374 A * | 3/1992 | Ohkita | ........... | G11B 25/043 |
| 5,675,456 A * | 10/1997 | Myers | ........... | F16C 27/04 |
| | | | | 360/99.15 |
| 6,256,173 B1 * | 7/2001 | Chee | ........... | G11B 33/08 |
| 6,556,387 B1 * | 4/2003 | Misso | ........... | G11B 5/5521 |
| 7,280,317 B1 * | 10/2007 | Little | ........... | G11B 5/4813 |
| 7,379,273 B2 * | 5/2008 | Culver | ........... | G11B 5/5569 |
| 7,513,030 B2 * | 4/2009 | Aoyagi | ........... | G11B 5/4813 |
| | | | | 29/603.03 |
| 10,460,753 B1 * | 10/2019 | Shi | ........... | G11B 5/4813 |
| 10,891,980 B1 * | 1/2021 | Keshavan | ........... | G11B 25/043 |

(Continued)

FOREIGN PATENT DOCUMENTS

| EP | 1336968 A1 * | 8/2003 | ............ | G11B 33/08 |
|---|---|---|---|---|
| JP | 2002324373 A * | 11/2002 | ............ | F16C 19/08 |
| JP | 2017059284 A * | 3/2017 | ............ | F16C 33/80 |

*Primary Examiner* — William J Klimowicz
(74) *Attorney, Agent, or Firm* — JCIPRNET

(57) ABSTRACT

A disk driving device includes a disk, a motor, an arm, a head, and a housing. The disk rotates about a rotation shaft. The motor causing the disk to rotate. The arm swings about a swinging shaft. The head is disposed at a tip of the arm for reading or writing information. The housing accommodates the disk, the motor, the arm, and the head, and includes a cast base plate with a bottom wall and an open top, and a cover. A separate pivot post protrudes from the bottom wall, and a tubular portion accommodates the pivot post, with the arm attached via a bearing. A screw inserted through the cover attaches to the pivot post's top end. The pivot post includes an annular portion. The tubular portion's top end contacts the cover, and its bottom end rests on the annular portion.

11 Claims, 8 Drawing Sheets

(56) References Cited

U.S. PATENT DOCUMENTS

| | | | |
|---|---|---|---|
| 11,948,609 B2* | 4/2024 | Ohnuma | F16C 19/08 |
| 12,087,324 B2* | 9/2024 | Ito | G11B 33/022 |
| 2002/0024770 A1* | 2/2002 | Hong | G11B 5/5565 |
| 2003/0156358 A1* | 8/2003 | Jeong | G11B 33/08 |
| 2005/0248886 A1* | 11/2005 | Culver | G11B 5/4813 |
| 2008/0186630 A1* | 8/2008 | Hur | G11B 5/4813 |
| 2014/0368951 A1* | 12/2014 | Lee | F16C 33/1085 |
| | | | 384/107 |
| 2016/0163349 A1* | 6/2016 | Yawata | B23K 26/03 |
| | | | 219/121.85 |
| 2016/0365105 A1* | 12/2016 | Kimura | F16F 15/08 |
| 2018/0358039 A1* | 12/2018 | Keshavan | G11B 5/5521 |
| 2019/0348071 A1 | 11/2019 | Shi et al. | |
| 2019/0348072 A1* | 11/2019 | Grantz | F16C 33/32 |
| 2020/0302958 A1* | 9/2020 | Hayasaka | G11B 5/4813 |
| 2022/0262403 A1* | 8/2022 | Ito | B22D 17/00 |
| 2022/0262408 A1* | 8/2022 | Ito | B22D 19/10 |
| 2023/0010930 A1* | 1/2023 | Okamoto | G11B 5/4813 |
| 2023/0335156 A1* | 10/2023 | Ohnuma | F16C 19/08 |
| 2023/0420003 A1* | 12/2023 | Kuribara | G11B 25/043 |
| 2024/0105220 A1* | 3/2024 | Uehara | G11B 5/4826 |

* cited by examiner

DISK DRIVING DEVICE FOR PREVENTING PIVOT POST FROM DROPPING FROM BASE PLATE

CROSS REFERENCE TO RELATED APPLICATIONS

The present invention claims priority under 35 U.S.C. § 119 to Japanese Application No. 2022-199130 filed on Dec. 14, 2022, the entire content of which is incorporated herein by reference.

BACKGROUND

Field of the Invention

The disclosure relates to a disk driving device.

Background

A disk driving device according to the related art includes a disk, a motor, an arm, a head, and a housing. The housing accommodates the disk, the motor, the arm, and the head. The housing includes a base plate, a cover, a pivot post, a tubular portion, and a screw.

The base plate is a cast product and has a box shape including a bottom wall extending perpendicularly to a rotation shaft and an open top. The cover has a plate shape covering the open top of the base plate. The pivot post protrudes upward from the top surface of the bottom wall along a swinging shaft. The pivot post is a cast product formed integrally with the base plate. The tubular portion accommodates the pivot post therein, and an arm is attached thereto via a bearing provided on an outer circumference thereof. The screw is inserted into a through-hole provided in the cover and is screwed to a screw hole provided on the top end of the pivot post. The top end of the tubular portion is located above the top end of the pivot post and is in contact with a bottom of the cover. Accordingly, a gap is formed between the pivot post and the cover.

However, in the disk driving device according to the related art, fluidity to the pivot post at the time of cast-forming is poor and there is a likelihood that a shrinkage cavity will be formed in the pivot post. Accordingly, there is a likelihood that gas filled into the housing will leak to the outside via the pivot post. On the other hand, when the pivot post is formed of a separate member without a shrinkage cavity and is attached to the base plate, the screw presses the tubular portion downward via the cover at the time of being screwed to the screw hole. At this time, since a gap is formed between the pivot post and the cover, a force for pulling the pivot post upward from the base plate also acts. Accordingly, there is a likelihood that the pivot post will drop from the base plate.

SUMMARY

A disk driving device according to an embodiment of the disclosure includes a disk, a motor, an arm, a head, and a housing. The disk rotates about a rotation shaft extending in a vertical direction. The motor causes the disk to rotate. The arm swings about a swinging shaft which is disposed at a position different from the rotation shaft and which extends in the vertical direction. The head is disposed at a tip of the arm and is configured to perform reading or writing of information from or to the disk. The housing accommodates the disk, the motor, the arm, and the head. The housing includes a base plate, a cover, a pivot post, a tubular portion, and a screw. The base plate is a cast product and has a box shape including a bottom wall extending perpendicularly to the rotation shaft and an open top. The cover has a plate shape covering an opening of the base plate. The pivot post is a member separate from the base plate and protrudes upward from a top surface of the bottom wall along the swinging shaft. The tubular portion has a tube shape accommodating the pivot post, and the arm is attached thereto via a bearing disposed on an outer circumference thereof. The screw is inserted into a through-hole provided in the cover and is screwed to a screw hole provided at a top end of the pivot post. The pivot post includes an annular portion in a ring shape protruding in a radial direction from an outer circumferential surface thereof. A top end of the tubular portion is located above the top end of the pivot post and is in contact with a bottom surface of the cover. A bottom end of the tubular portion is disposed on the annular portion.

The above and other elements, features, steps, characteristics and advantages of the present disclosure will become more apparent from the following detailed description of the preferred embodiments with reference to the attached drawings.

DETAILED DESCRIPTION

Exemplary embodiments of the disclosure will be described below in detail with reference to the accompanying drawings. In this specification, a direction parallel to a rotation axis C of a disk 50 or a swinging axis D is referred to as an "axial direction," a direction perpendicular to the rotation axis C or the swinging axis D is referred to as a "radial direction," and a direction along an arc centered on the rotation axis C or the swinging axis D is referred to as a "circumferential direction." In this specification, shapes and positional relationships of constituents will be described with definition of the axial direction as a vertical direction and definition of a cover 42 side from a base plate 41 as upward. This is not intended to limit directions of a base plate 41 and a disk driving device 1 according to the disclosure in use to the definition of the vertical direction.

Figure 1:
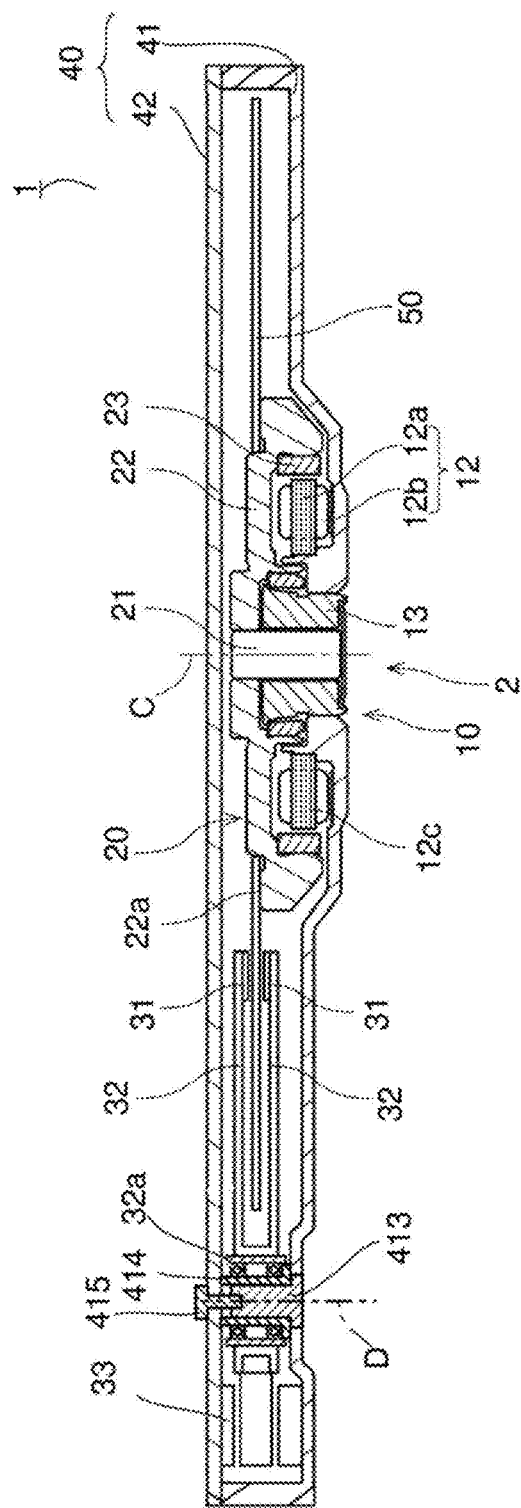
FIG. 1 is a longitudinal sectional view of a disk driving device according to a first embodiment of the disclosure.

A disk driving device 1 according to an exemplary embodiment of the disclosure will be described below. FIG. 1 is a longitudinal sectional view of the disk driving device 1 according to an embodiment of the disclosure.

The disk driving device 1 is a hard disk drive. The disk driving device 1 includes a spindle motor (a motor) 2, a disk 50, a head 31, an arm 32, and a housing 40.

The housing 40 accommodates the spindle motor 2, the disk 50, the head 31, the arm 32, and a swinging mechanism 33 therein.

The housing 40 is filled with a gas with a lower density than air. Accordingly, it is possible to reduce an air flow resistance in the housing 40 and thus to reduce vibration of the disk 50. Specifically, the housing 40 is filled with a helium gas. The housing 40 may be filled with hydrogen gas instead of helium gas.

The spindle motor 2 supports the disk 50 and causes the disk 50 to rotate about the rotation axis C. That is, the disk 50 is made to rotate about the rotation axis C extending in the vertical direction by the spindle motor 2. The spindle motor 2 includes a stationary portion 10 and a rotary portion 20. The stationary portion 10 is stationary with respect to the housing 40. The rotary portion 20 is supported to be rotatable with respect to the stationary portion 10.

The stationary portion 10 includes a stator 12 and a bearing unit 13. A part of a base plate 41 constitutes the stationary portion 10. That is, the spindle motor 2 includes the base plate 41. The base plate 41 extends perpendicularly to the rotation axis C below the rotary portion 20. The base plate 41 is a part of the spindle motor 2 and is also a part of the housing 40. The stator 12 and the bearing unit 13 are fixed to the base plate 41.

The stator 12 includes a stator core 12a which is a magnetic substance and a plurality of coils 12b. The stator core 12a includes a plurality of teeth 12c protruding outward in a radial direction. The plurality of coils 12b is constituted by wires wound on the teeth 12c.

The bearing unit 13 rotatably supports a shaft 21 on the rotary portion 20 side. For example, a fluid dynamic-pressure bearing mechanism is used as the bearing unit 13.

The rotary portion 20 includes a shaft 21, a hub 22, and a magnet 23. The shaft 21 is a columnar member extending in the axial direction. The lower end portion of the shaft 21 is accommodated in the bearing unit 13.

The bub 22 is fixed to an upper end portion of the shaft 21 and extends outward in the radial direction. A top surface of an outer circumferential portion 22a of the hub 22 supports the disk 50. The magnet 23 is fixed to an inner circumferential surface of the hub 22 and is oppositely disposed apart by a predetermined distance outward in the radial direction from the stator 12. The magnet 23 has a circular arc shape, and the N pole and the S pole are alternately magnetized in the circumferential direction on the inner circumferential surface of the magnet 23.

When a drive current is supplied to the coils 12b, a magnetic flux is generated in the plurality of teeth 12c. At this time, the teeth 12c and the magnet 23 interact with each other using the magnetic flux, and a torque in the circumferential direction is generated. Accordingly, the rotary portion 20 rotates about the rotation axis C with respect to the stationary portion 10. The disk 50 supported by the hub 22 rotates about the rotation axis C along with the rotary portion 20.

In the aforementioned exemplary embodiment, a bearing mechanism is of a shaft-rotating type in which the shaft rotates is described, but a shaft-fixed type in which the shaft is fixed may be appropriately employed.

The disk 50 is a disc-shaped information recording medium including a hole at the center thereof. The disk 50 is attached to the spindle motor 2.

The arm 32 is attached to a tubular portion 414 of which details will be described later via the bearing 32a. The head 31 is disposed at a tip of the arm 32 and performs reading or writing of information from or to the disk 50.

The swinging mechanism 33 is a mechanism for causing the arm 32 and the head 31 to swing. When the swinging mechanism 33 is driven, the arm 32 swings about the swinging axis D. That is, the head 31 is made to swing about the swinging axis D via the arm 32 by the swinging mechanism 33. At this time, the head 31 moves relatively to the disk 50 and approaches and accesses the rotating disk 50.

Figure 2:
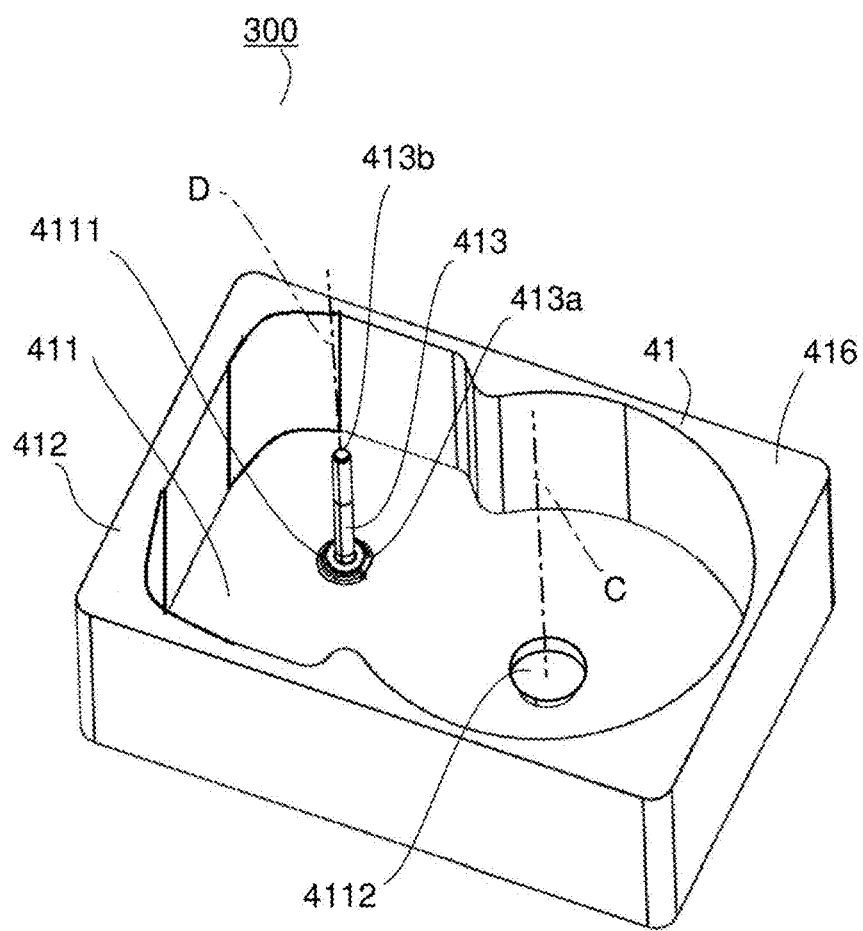
FIG. 2 is a perspective view schematically illustrating a base plate unit of the disk driving device according to the first embodiment of the disclosure.
Figure 3:
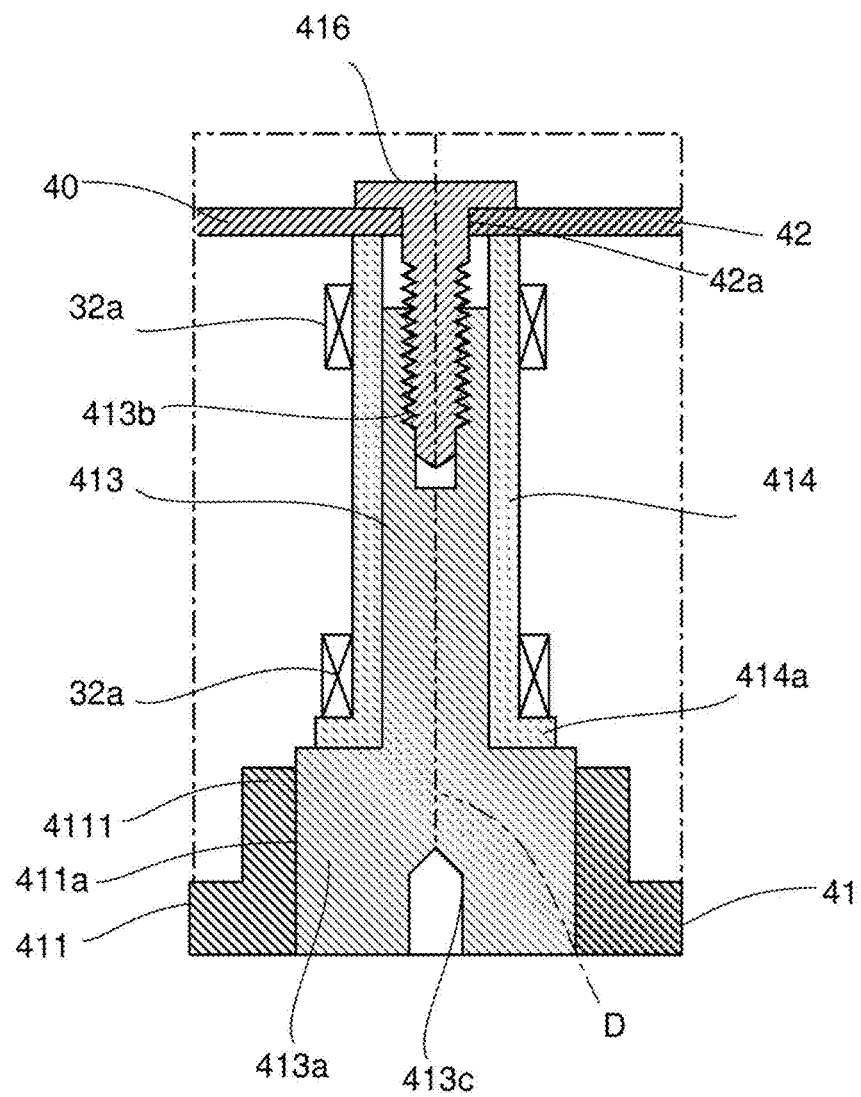
FIG. 3 is an enlarged longitudinal sectional view schematically illustrating a pivot post of the disk driving device according to the first embodiment of the disclosure.

FIG. 2 is a perspective view schematically illustrating a base plate unit 300. FIG. 3 is an enlarged longitudinal sectional view schematically illustrating the pivot post 413 of the disk driving device 1. In FIG. 3, the disk 50 is not illustrated.

The housing 40 includes a base plate 41, a cover 42, a pivot post 413, a tubular portion 414, and a screw 416. The base plate 41 and the pivot post 413 constitute the base plate unit 300. The base plate 41 is a cast product and is formed by cast-forming a metallic die casting material formed of an aluminum alloy. A metal other than aluminum may be used as the die casting material. The base plate 41 has a box shape of which the top is open. The cover 42 has a plate shape covering the top opening of the base plate 41.

The base plate 41 includes a bottom wall 411 and a circumferential wall 412. In this embodiment, the bottom wall 411 and the circumferential wall 412 are a cast product formed as a unified body, but the bottom wall 411 and the circumferential wall 412 cast as separate members may be assembled to constitute the base plate 41.

The bottom wall 411 has a rectangular shape when seen in the axial direction and extends perpendicularly to the rotation axis C and the swinging axis D. The spindle motor 2 is supported by the bottom wall 411 via a bearing through-hole 4112. The swinging mechanism 33 is supported by the bottom wall 411 via the pivot post 413 protruding upward from the top surface of the bottom wall 411.

The bottom wall 411 includes a pivot through-hole 411a, a pedestal 4111, and a bearing through-hole 4112. The bearing through-hole 4112 penetrates the bottom wall 411 along the rotation axis C in the axial direction. The bearing through-hole 4112 holds the bearing unit 13 therein. When the bearing mechanism is of a shaft-fixed type, the shaft 21 is pressed into the bearing through-hole 4112.

The pedestal 4111 protrudes upward from the top surface of the bottom wall 411 along the swinging axis D and is formed in a tube shape. The pivot through-hole 411a penetrates the bottom wall 411 along the swinging axis D in the axial direction. The pivot post 413 is pressed into to the pivot through-hole 411a. In a state in which the pivot post 413 is pressed into the pivot through-hole 411a, the pivot post 413 is held on the pedestal 4111. At this time, an annular portion 413a which will be described later is disposed in the pedestal 4111. Accordingly, the pivot post 413 is held in the pedestal 4111 and is strongly fixed to the bottom wall 411.

The circumferential wall 412 extends upward in the axial direction from an outer circumferential edge of the bottom wall 411 and surrounds the bottom wall 411. The cover 42 is screwed to the top end face of the circumferential wall 412.

The pivot post 413 protrudes upward from the top surface of the bottom wall 411 along the swinging axis D and is formed in a cylindrical shape. The pivot post 413 is formed of, for example, a metal such as stainless steel with higher rigidity than an aluminum alloy and has higher rigidity than a metal constituting the circumferential wall 412. By forming the pivot post 413 as a member separate from the base plate 41, it is possible to enhance the rigidity of the pivot post 413 and to prevent generation of a shrinkage cavity in the pivot post 413. Accordingly, it is possible to curb leakage of a gas filled in the housing 40 to the outside via the pivot post 413.

The pivot post 413 includes an annular portion 413a, a screw hole 413b, a recess 413c. The annular portion 413a protrudes in a radial direction from an outer circumferential surface of the pivot post 413. The top end face of the annular portion 413a is located above the top end face of the pedestal 4111.

The recess 413c is disposed on the swinging axis D and recessed upward from the bottom surface of the pivot post 413. The top end of the recess 413c is located below the top end of the annular portion 413a. Accordingly, it is possible to prevent the inside of the pivot post 413 from being thinning by the recess 413c and to curb a decrease in strength of the pivot post 413. It is possible to easily adjust the inclination of the pivot post with respect to the swinging axis D by inserting a jig into the recess 413c. In this embodiment, the tip of the recess 413c has a conic shape, but the disclosure is not limited to the shape.

The screw hole 413b is recessed in the axial direction from the top end of the pivot post 413. The screw hole 413b is formed, for example, by cutting.

The tubular portion 414 has a tube shape and accommodates the pivot post 413 therein. The arm 32 is attached to the tubular portion 414 via a bearing 32a disposed on the outer circumference thereof. The top end of the tubular portion 414 is located above the top end of the pivot post 413 and is in contact with the bottom surface of the cover 42. The bottom end of the tubular portion 414 is disposed on the annular portion 413a.

The tubular portion 414 includes a protruding portion 414a in a ring shape protruding in the radial direction from the bottom end of an outer circumferential surface. At least a part of the protruding portion 414a overlaps the annular portion 413a in the axial direction. In this embodiment, an outer end in the radial direction of the annular portion 413a is located radially outward from an outer end in the radial direction of the protruding portion 414a.

The screw 416 is inserted into a through-hole 42a formed in the cover 42 and screwed to the screw hole 413b. At this time, the screw hole 413b, the through-hole 42a, the tubular portion 414, and the screw 416 overlap each other on the swinging axis D. The top end of the tubular portion 414 is located above the top end of the pivot post 413 and is in contact with the bottom surface of the cover 42, and thus a gap is formed between the pivot post 413 and the cover 42.

When the screw 416 is screwed to the screw hole 413b, the screw presses the tubular portion 414 via the cover 42 downward. At this time, since a gap is formed between the pivot post 413 and the cover 42, a force for pulling the pivot post 413 upward from the bottom wall 411 also acts. On the other hand, the bottom end of the tubular portion 414 is disposed on the annular portion 413a, and the force for pressing the tubular portion 414 downward and the force for pulling the pivot post 413 upward are cancelled out in the vertical direction. Accordingly, it is possible to prevent the pivot post 413 from dropping from the base plate 41.

At least a part of the protruding portion 414a overlaps the annular portion 413a in the axial direction. The outer end in the radial direction of the annular portion 413a is located radially outward from the outer end in the radial direction of the protruding portion 414a. Accordingly, an area in which the tubular portion 414 and the pivot post 413 overlap each other in the axial direction is enlarged. Accordingly, the force for pressing the tubular portion 414 downward and the force for pulling the pivot post 413 upward are stably cancelled out in the vertical direction. Accordingly, it is possible to prevent deformation of the tubular portion 414 or the pivot post 413 at the time of screwing and to more reliably prevent the pivot post 413 from dropping from the bottom wall 411.

The top end face of the annular portion 413a is located above the top end face of the pedestal 4111, and thus it is possible to prevent the protruding portion 414a and the pedestal 4111 from coming into contact. Accordingly, as described above, it is possible to more reliably prevent the pivot post 413 from dropping from the bottom wall 411 and to prevent the pivot post 413 from being fixed with an inclination with respect to the swinging axis D.

The base plate unit 300 serving as a part of the housing 40 of the disk driving device 1 includes the base plate 41 including the bottom wall 411 extending perpendicularly to the rotation axis C of the disk 50 extending in the vertical direction and the pivot post 413 protruding upward from the top surface of the bottom wall 411 along the swinging axis D of the head 33 being disposed at a position different from the rotation axis C and performing reading or writing of information from or to the disk 50 (see FIG. 2). The pivot post 413 is a member separate from the base plate 41. The pivot post 413 includes the annular portion 413a in a ring shape protruding in the radial direction from the outer circumferential surface thereof. The bottom wall 411 includes the pedestal 4111 in a tube shape protruding upward from the top surface along the swinging axis D. The annular portion 413a is disposed inside of the pedestal 4111, and the top end face of the annular portion 413a is located above the top end face of the pedestal 4111.

Figure 4:
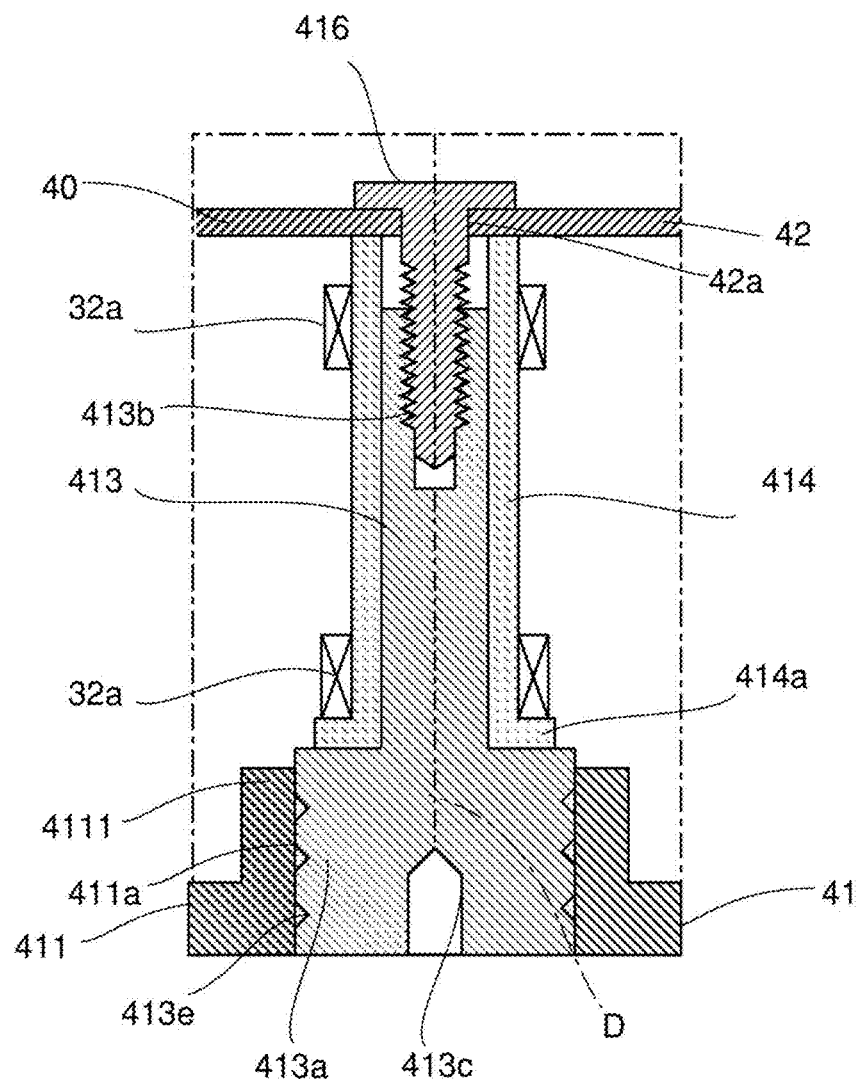
FIG. 4 is a longitudinal sectional view schematically illustrating a pivot post of a disk driving device according to a second embodiment of the disclosure.

A second embodiment of the disclosure will be described below. FIG. 4 is a longitudinal sectional view schematically illustrating a pivot post of a disk driving device 1 according to the second embodiment of the disclosure. In FIG. 4, the disk 50 is not illustrated. For the purpose of convenience of explanation, the same elements as in the first embodiment illustrated in FIGS. 1 to 3 will be referred to by the same reference signs. In the second embodiment, the annular portion 413a includes a circumferential groove 413e. The other elements are the same as in the first embodiment, and the same advantages as in the first embodiment are achieved.

The circumferential groove 413e is formed on the outer circumferential surface of the annular portion 413a. In this embodiment, the circumferential groove 413e extends in the circumferential direction of the swinging axis D and a plurality of circumferential grooves is arranged in the axial direction. An adhesive (not illustrated) is provided between the outer circumferential surface of the annular portion 413a and the inner circumferential surface of the pedestal 4111. Accordingly, the pivot post 413 is strongly fixed to the inside of the pedestal 4111 with the adhesive.

In this embodiment, the circumferential groove 413e extends in the circumferential direction, but may extend in the axial direction. In this case, a plurality of circumferential grooves 413e is preferably arranged in the circumferential direction. The circumferential groove 413e may be formed in a spiral shape.

The circumferential groove 413e may be formed on the inner circumferential surface of the pivot through-hole 411a. The depth of the circumferential groove 413e may be changed. Accordingly, the pivot post 413 can be more strongly fixed to the inside of the pedestal 4111 with the adhesive.

Figure 5:
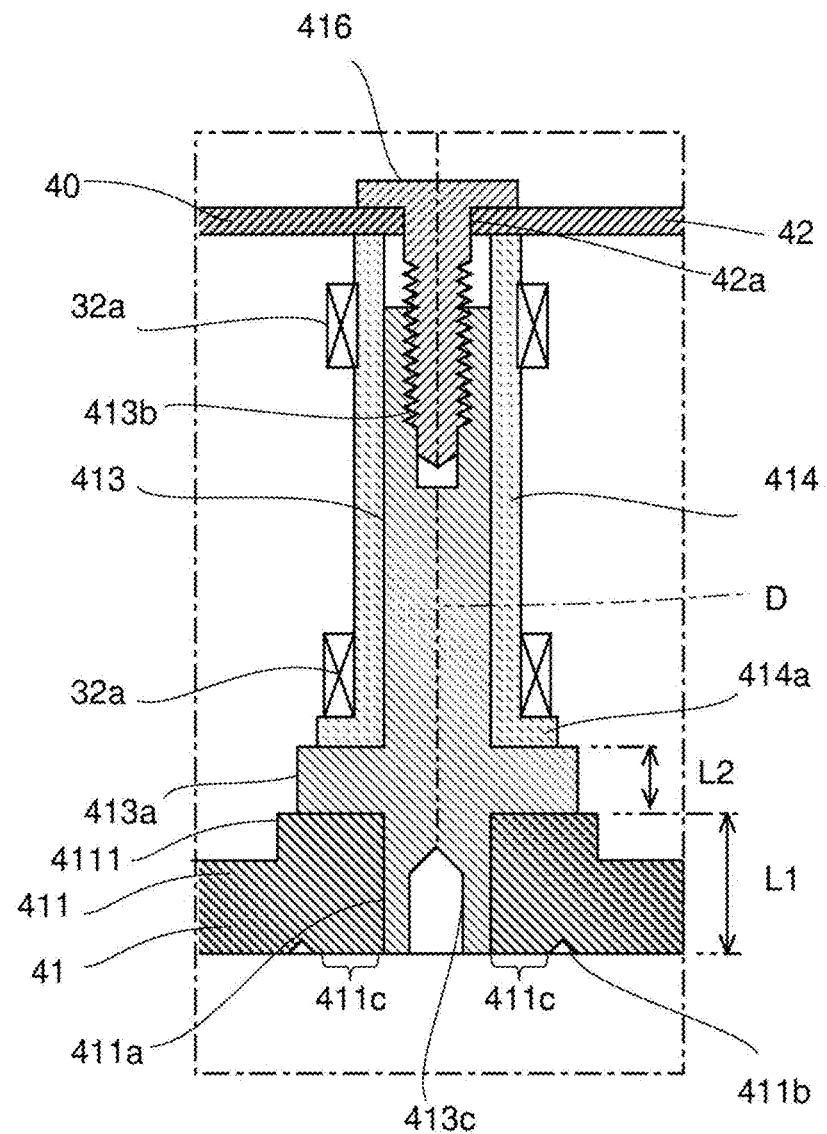
FIG. 5 is a longitudinal sectional view schematically illustrating a pivot post of a disk driving device according to a third embodiment of the disclosure.

A third embodiment of the disclosure will be described below. FIG. 5 is a longitudinal sectional view schematically illustrating a pivot post of a disk driving device 1 according to the third embodiment. In FIG. 5, the disk 50 is not illustrated. For the purpose of convenience of explanation, the same elements as in the first embodiment illustrated in FIGS. 1 to 3 will be referred to by the same reference signs. In the third embodiment, the annular portion 413a is provided in contact with the top surface of the pedestal 4111 (the bottom wall 411). The outer end in the radial direction of the pedestal 4111 is located radially outward from the outer end in the radial direction of the annular portion 413a. The bottom wall 411 includes a machined surface 411c and a groove 411b. The other elements are the same as in the first embodiment, and the same advantages as in the first embodiment are achieved.

By forming the annular portion 413a in contact with the top surface of the pedestal 4111 (the bottom wall 411), it is possible to decrease the diameter of the pivot through-hole 411a. Accordingly, it is possible to reduce leakage of a helium gas filled in the housing 40 to the outside. It is preferable that the top surface of the pedestal 4111 and the bottom surface of the annular portion 413a be formed as planes perpendicular to the swinging axis D. Accordingly, by bringing the pedestal 4111 and the annular portion 413a into contact with each other, it is possible to prevent inclination with respect to the swinging axis D and to easily attach the pivot post 413 to the bottom wall 411.

A length L1 in the axial direction of the pivot post 413 provided inside of the bottom wall 411 (inside of the pivot through-hole 411a) is greater than a length L2 in the axial direction of the annular portion 413a. Accordingly, it is possible to strongly fix the pivot post 413 to the bottom wall 411. The outer end in the radial direction of the pedestal 4111 is located radially outward from the outer end in the radial direction of the annular portion 413a, and it is possible to further prevent the pivot post 413 from being inclined with respect to the swinging axis D.

The machined surface 411c is formed in a ring shape surrounding the pivot post 413 on the bottom surface of the bottom wall 411. The groove 411b is formed along the outer circumferential edge of the machined surface 411c. A surface roughness of the machined surface 411c is less than a surface roughness on the radial outer side of the groove 411b. When the pivot post 413 is attached to the bottom wall 411, it is possible to accurately attach the pivot post 413 without inclination with respect to the swinging axis D by using the machined surface 411c as a receiving surface.

By providing the groove 411b, it is possible to prevent the machined surface 411c from extending radially outward from the groove 411b when the machined surface 411c is cut. Accordingly, for example, by forming the machined surface 411c to protrude downward in the axial direction from an area radially outward from the groove 411b at the time of casting, cutting can be performed on only the machined surface 411c and thus the machined surface 411c can be easily formed at the same height as the area radially outward from the groove 411b. Accordingly, it is possible to easily precisely flatten the bottom surface of the bottom wall 411.

Figure 6:
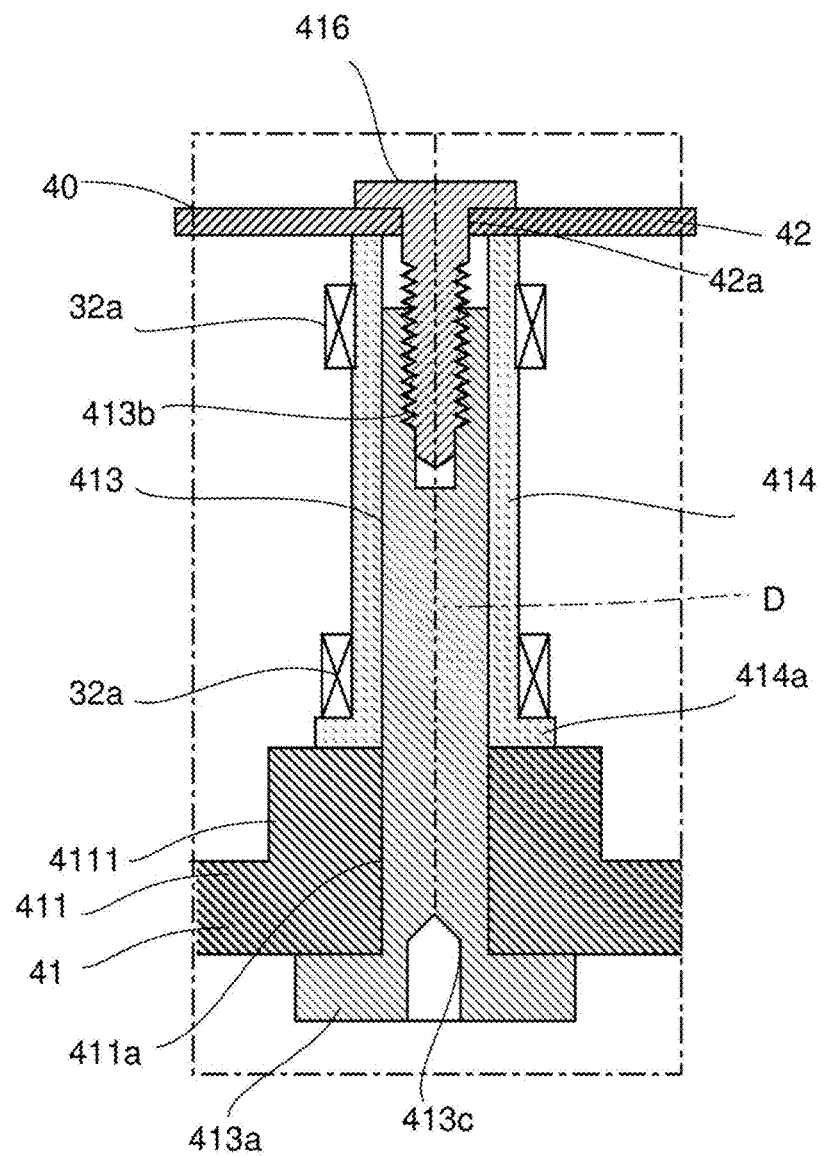
FIG. 6 is a longitudinal sectional view schematically illustrating a modified example of the pivot post of the disk driving device according to the third embodiment of the disclosure.
Figure 7:
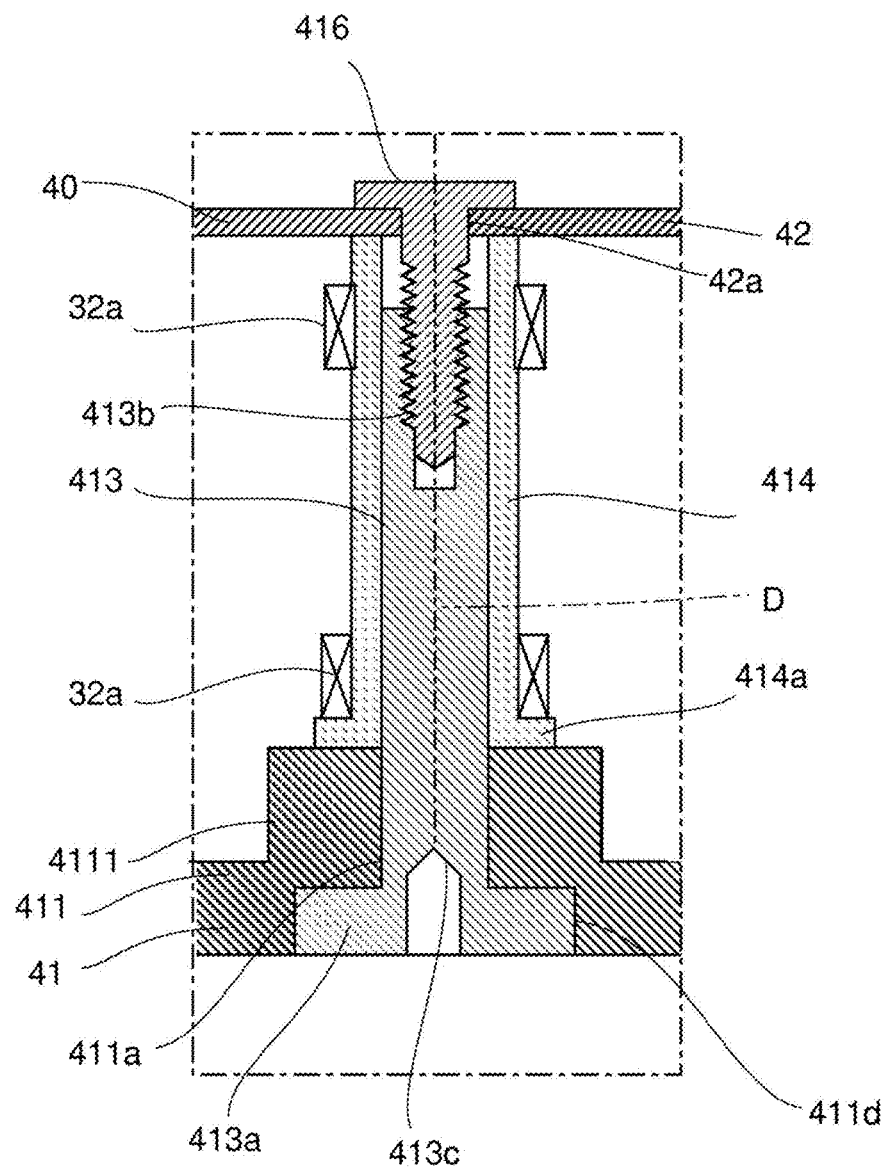
FIG. 7 is a longitudinal sectional view schematically illustrating a modified example of the pivot post of the disk driving device according to the third embodiment of the disclosure.
Figure 8:
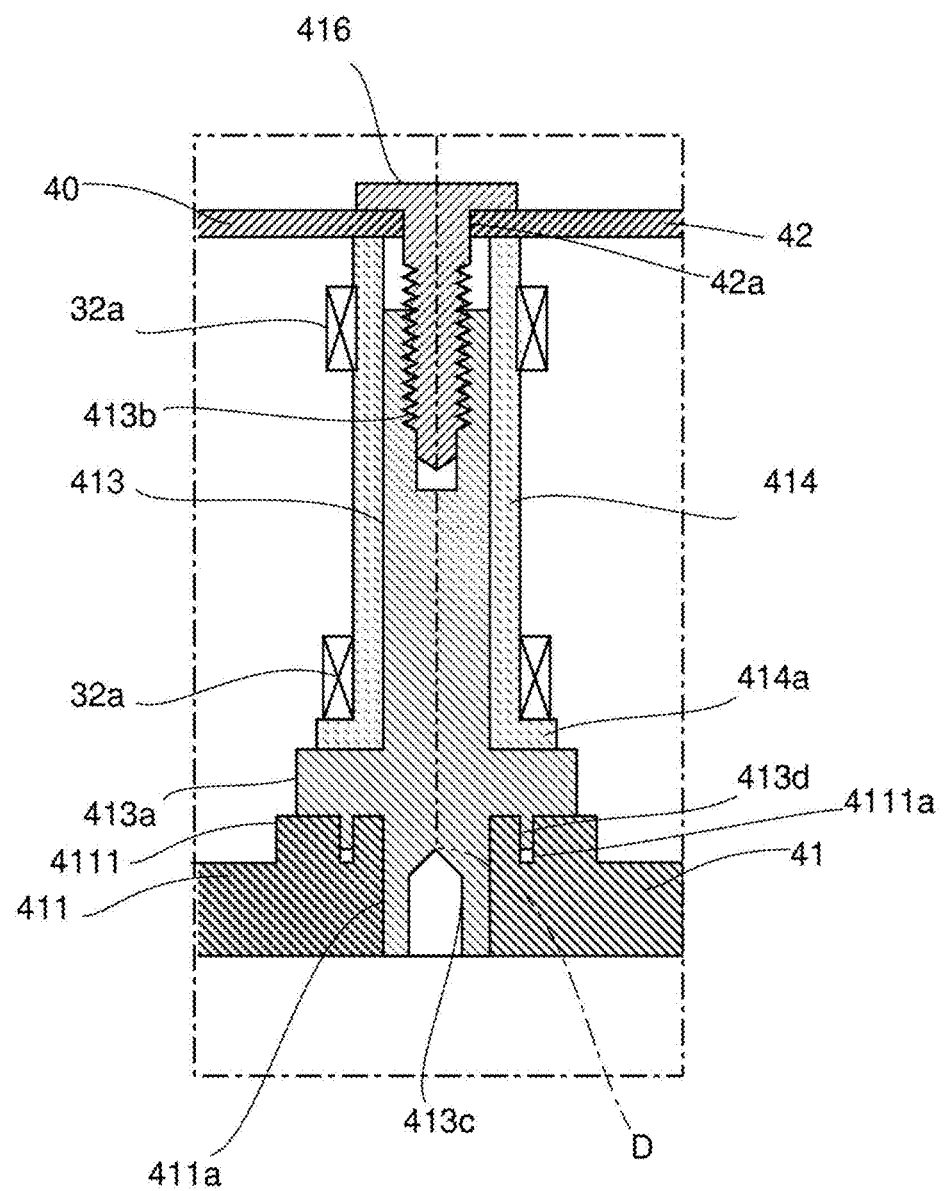
FIG. 8 is a longitudinal sectional view schematically illustrating a modified example of the pivot post of the disk driving device according to the third embodiment of the disclosure.

FIGS. 6, 7, and 8 are longitudinal sectional views schematically illustrating modified examples of the pivot post of the disk driving device 1 according to the third embodiment. As illustrated in FIGS. 6 and 7, the annular portion 413a may be in contact with the bottom surface of the bottom wall 411. In this case, the pivot post 413 is inserted into a pivot through-hole 411a from the bottom surface of the bottom wall 411.

As illustrated in FIG. 7, a bottom-wall recess 411d recessed upward in the axial direction from the bottom surface of the bottom wall 411 may be provided on the pivot through-hole 411a. The annular portion 413a is disposed inside of the bottom-wall recess 411d. Accordingly, the bottom surface of the annular portion 413a and the bottom surface of the bottom wall 411 can be made to be flush with each other. The bottom surface of the annular portion 413a may be located above the bottom surface of the bottom wall 411 in the axial direction. Accordingly, it is possible to prevent the base plate unit 300 from being enlarged in the axial direction.

As illustrated in FIG. 8, the annular portion 413a may include a protrusion 413d protruding from the bottom surface, and the bottom wall 411 may include a bottom-wall recess 4111a recessed downward from the top surface. The protrusion 413d is disposed inside of the bottom-wall recess 4111a. The protrusion 413d may be formed in a ring shape when seen in the axial direction or a plurality of protrusions may be disposed in the circumferential direction.

By disposing the protrusion 413d in the bottom-wall recess 4111a, it is possible to strongly fix the pivot post 413 on the bottom wall 411.

The bottom surface of the protrusion 413d is located above the bottom surface of the bottom-wall recess 4111a in the axial direction, and thus a gap is formed below the protrusion 413a in the bottom-wall recess 4111a. Accordingly, when the bottom-wall recess 4111a is filled with an adhesive, the gap serves as an adhesive pool. Accordingly, it is possible to more strongly fix the pivot post 413 to the bottom wall 411 with the adhesive.

The aforementioned embodiments are merely examples of the disclosure. The configurations according to the embodiments may be appropriately modified without departing from the technical spirit of the disclosure. For example, the pedestal 4111 may be omitted. In the embodiments, the pivot post 413 is pressed into the pivot through-hole 411a and is fixed to the base plate 41, but the disclosure is not limited thereto.

For example, the pivot post 413 may be incorporated into the base plate 41 by insert casting. At this time, by providing the pedestal 4111, a contact area between the pivot post 413 and the base plate 41 increases. Accordingly, the pivot post 413 is held in the pedestal 4111 and is strongly fixed to the bottom wall 411.

When the pivot post 413 is incorporated into the base plate 41 by insert casting, the contact area between the pivot post 413 and the base plate 41 increases by providing the circumferential groove 413e in the second embodiment on the outer circumferential surface of the annular portion 413a or the inner circumferential surface of the pivot through-hole 411a. Accordingly, the pivot post 413 is strongly fixed to the bottom wall 411.

It is preferable that the surface roughness of the outer circumferential surface of the annular portion 413a be set to be greater than the surface roughness of an area of the pivot post 413 exposed externally from the base plate 41. Accordingly, it is possible to improve adhesiveness between the annular portion 413a and the base plate 41 and to strongly fix the pivot post 413 on the bottom wall 411.

The pivot post 413 is not limited to a circular shape in a sectional surface perpendicular to the axial direction. For example, the outer circumferential surface of the pivot post 413 may be formed by continuously forming a curved surface and a plane in the circumferential direction. Accordingly, it is possible to strongly fix the pivot post 413 to the bottom wall 411. It is possible to prevent the pivot post 413 from rotating and departing in the circumferential direction with respect to the bottom wall 411.

The aforementioned embodiments may be combined. For example, the circumferential groove 413e according to the second embodiment may be provided in the annular portion 413a according to the embodiments other than the second embodiment.

A disk driving device (1) according to an aspect of the disclosure includes: a disk (50) rotating about a rotation shaft (C) extending in the vertical direction; a motor (2) causing the disk to rotate; an arm (32) swinging about a swinging shaft (D) which is disposed at a position different from the rotation shaft and which extends in the vertical direction; a head (33) disposed at a tip of the arm and configured to perform reading or writing of information from or to the disk; and a housing (40) accommodating the disk, the motor, the arm, and the head, wherein the housing includes a base plate (41) which is a cast product and which has a box shape including a bottom wall (411) extending perpendicularly to the rotation shaft and an open top, a cover (42) in a plate shape covering an opening of the base plate, a pivot post (413) being a member separate from the base plate and protruding upward from a top surface of the bottom wall along the swinging shaft; a tubular portion (414) in a tube shape accommodating the pivot post, the arm being attached thereto via a bearing disposed on an outer circumference thereof, and a screw (416) being inserted into a through-hole (42a) provided in the cover and being screwed to a screw hole provided at a top end of the pivot post, the pivot post includes an annular portion (413a) in a ring shape protruding in a radial direction from an outer circumferential surface thereof, a top end of the tubular portion is located above the top end of the pivot post and is in contact with a bottom surface of the cover, and a bottom end of the tubular portion is disposed on the annular portion (a first configuration).

In the first configuration, the tubular portion may include a protruding portion (414a) in a ring shape protruding in the radial direction from a bottom end of the outer circumferential surface thereof, and at least a part of the protruding portion may overlap the annular portion in an axial direction (a second configuration).

In the second configuration, an outer end in the radial direction of the annular portion may be located radially outward from an outer end in the radial direction of the protruding portion (a third configuration).

In any one of the first to third configurations, the bottom wall may include a pedestal (4111) in a tube shape protruding upward from the top surface along the swinging shaft, the annular portion may be disposed in the pedestal, and a top end face of the annular portion is located above a top end face of the pedestal (a fourth configuration).

In any one of the first to fourth configurations, the annular portion may include a circumferential groove (413e) extending in a circumferential direction of the swinging shaft on an outer circumferential surface thereof, and an adhesive may be disposed between the outer circumferential surface of the annular portion and an inner circumferential surface of the pedestal (a fifth configuration).

In any one of the first to fifth configurations, the pivot post may include a recess (413c) which is disposed on the swinging shaft and recessed upward from the bottom surface, and a top end of the recess may be located below the top end of the annular portion (a sixth configuration).

In any one of the first to sixth configurations, the annular portion may be disposed in contact with the top surface of the bottom wall (a seventh configuration).

In the seventh configuration, a length (L1) in an axial direction of the pivot post disposed inside of the bottom wall may be larger than a length (L2) in the axial direction of the annular portion (an eighth configuration).

In any one of the first to eighth configurations, the bottom wall may include a pedestal (4111) in a tube shape protruding upward from the top surface along the swinging shaft, the annular portion may be disposed in contact with the top surface of the pedestal, and an outer end in the radial direction of the pedestal may be located radially outward from the outer end in the radial direction of the annular portion (a ninth configuration).

In any one of the first to ninth configurations, the annular portion may include a protrusion (413d) protruding from the bottom surface, and the bottom wall may include a bottom-wall recess (4111a) recessed downward from the top surface, the protrusion being disposed therein (a tenth configuration).

In any one of the first to tenth configurations, the bottom wall may include a machined surface (411c) in a ring shape surrounding the pivot post on the bottom surface and a groove (411b) formed along an outer circumference of the machined surface, and a surface roughness of the machined surface may be less than a surface roughness radially outward from the groove (an eleventh configuration).

In any one of the first to eleventh configurations, the housing may be filled with a gas with a lower density than air (a twelfth configuration).

A base plate unit (300) according to an aspect of the disclosure is a base plate unit serving as a part of a housing (40) of a disk driving device (10) and includes a base plate (41) including a bottom wall (411) extending perpendicularly to a rotation shaft (C) of a disk (50) extending in the vertical direction and a pivot post (413) being disposed at a position different from the rotation shaft and protruding upward from a top surface of the bottom wall along a swinging shaft (D) of a head (33) performing reading or writing of information from or to the disk, the pivot post is a member separate from the base plate and includes an annular portion (413a) in a ring shape protruding in a radial direction from an outer circumferential surface, the bottom wall includes a pedestal (4111) in a tube shape protruding upward from the top surface along the swinging shaft, the annular portion is disposed inside of the pedestal, and a top end face of the annular portion is located above a top end face of the pedestal (a thirteenth configuration).

In the thirteenth configuration, the annular portion may include a circumferential groove (413c) extending in a circumferential direction of the swinging shaft on an outer circumferential surface thereof, and an adhesive may be disposed between the outer circumferential surface of the annular portion and an inner circumferential surface of the pedestal (a fourteenth configuration).

In the thirteenth or fourteenth configuration, the pivot post may include a recess (413c) which is disposed on the swinging shaft and recessed upward from the bottom surface, and a top end of the recess may be located below the top end of the annular portion (a fifteenth configuration).

In any one of the thirteenth to fifteenth configurations, the annular portion may be disposed in contact with the top surface of the bottom wall, and a length (L1) in an axial direction of the pivot post disposed inside of the bottom wall is larger than a length (L2) in the axial direction of the annular portion (a sixteenth configuration).

In any one of the thirteenth to sixteenth configurations, the annular portion may be disposed in contact with the top surface of the pedestal, and an outer end in the radial direction of the pedestal may be located radially outward from an outer end in the radial direction of the annular portion (a seventeenth configuration).

In any one of the thirteenth to seventeenth configurations, the annular portion may include a protrusion (413d) protruding from the bottom surface, and the bottom wall may include a bottom-wall recess (4111a) recessed downward from the top surface in which the protrusion is disposed (an eighteenth configuration).

In any one of the thirteenth to eighteenth configurations, the bottom wall may include a machined surface (411c) in a ring shape surrounding the pivot post on the bottom surface and a groove (411b) formed along an outer circumference of the machined surface, and a surface roughness of the machined surface is less than a surface roughness radially outward from the groove (a nineteenth configuration).

There may be provided a spindle motor including the base plate unit according to any one of the thirteenth to nineteenth configurations (a twentieth configuration).

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The disclosure can be used, for example, for a disk driving device such as a hard disk drive.

What is claimed is:

1. A disk driving device comprising:
a disk rotating about a rotation shaft extending in a vertical direction;
a motor causing the disk to rotate;
an arm swinging about a swinging shaft which is disposed at a position different from the rotation shaft and which extends in the vertical direction;
a head disposed at a tip of the arm and configured to perform reading or writing of information from or to the disk; and
a housing accommodating the disk, the motor, the arm, and the head,
wherein the housing includes:
a base plate which is a cast product and which has a box shape including a bottom wall extending perpendicularly to the rotation shaft and an open top;
a cover in a plate shape covering an opening of the base plate;
a pivot post being a member separate from the base plate and protruding upward from a top surface of the bottom wall along the swinging shaft;
a tubular portion in a tube shape accommodating the pivot post, the arm being attached thereto via a bearing disposed on an outer circumference thereof; and
a screw being inserted into a through-hole provided in the cover and being screwed to a screw hole provided at a top end of the pivot post,
wherein the pivot post includes an annular portion in a ring shape protruding in a radial direction from an outer circumferential surface thereof,
wherein a top end of the tubular portion is located above the top end of the pivot post and is in contact with a bottom surface of the cover, and
wherein a bottom end of the tubular portion is disposed on the annular portion, wherein
the bottom wall includes a pedestal in a tube shape protruding upward from the top surface along the swinging shaft, wherein
the annular portion is disposed in the pedestal, and wherein
a top end face of the annular portion is located above a top end face of the pedestal.

2. The disk driving device according to claim 1, wherein the tubular portion includes a protruding portion in a ring shape protruding in the radial direction from a bottom end of the outer circumferential surface thereof, and
wherein at least a part of the protruding portion overlaps the annular portion in an axial direction.

3. The disk driving device according to claim 2, wherein an outer end in the radial direction of the annular portion is located radially outward from an outer end in the radial direction of the protruding portion.

4. The disk driving device according to claim 1, wherein the annular portion includes a circumferential groove extending in a circumferential direction of the swinging shaft on an outer circumferential surface thereof, and
wherein an adhesive is disposed between the outer circumferential surface of the annular portion and an inner circumferential surface of the pedestal.

5. The disk driving device according to claim 1, wherein the pivot post includes a recess which is disposed on the swinging shaft and recessed upward from the bottom surface, and
wherein a top end of the recess is located below the top end of the annular portion.

6. The disk driving device according to claim 1, wherein the annular portion is disposed in contact with the top surface of the bottom wall.

7. The disk driving device according to claim 6, wherein a length in an axial direction of the pivot post disposed inside of the bottom wall is larger than a length in the axial direction of the annular portion.

8. The disk driving device according to claim 1,
wherein the annular portion is disposed in contact with the top surface of the pedestal, and
wherein an outer end in the radial direction of the pedestal is located radially outward from the outer end in the radial direction of the annular portion.

9. The disk driving device according to claim 1, wherein the annular portion includes a protrusion protruding from the bottom surface, and
wherein the bottom wall includes a bottom-wall recess recessed downward from the top surface, the protrusion being disposed therein.

10. The disk driving device according to claim 1, wherein the bottom wall includes:
a machined surface in a ring shape surrounding the pivot post on the bottom surface; and
a groove formed along an outer circumference of the machined surface, and wherein a surface roughness of the machined surface is less than a surface roughness a surface radially outward from the groove.

11. The disk driving device according to claim 1, wherein the housing is filled with a gas with a lower density than air.

* * * * *